(12) United States Patent
Martin et al.

(10) Patent No.: US 11,020,963 B2
(45) Date of Patent: Jun. 1, 2021

(54) FLUID PARTICLE CONCENTRATION DETECTION

(71) Applicant: Hewlett-Packard Development Company, L.P., Spring, TX (US)

(72) Inventors: Eric Martin, Corvallis, OR (US); Daryl E. Anderson, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/760,925

(22) PCT Filed: Dec. 11, 2017

(86) PCT No.: PCT/US2017/065552
§ 371 (c)(1),
(2) Date: May 1, 2020

(87) PCT Pub. No.: WO2019/117850
PCT Pub. Date: Jun. 20, 2019

(65) Prior Publication Data
US 2020/0298559 A1 Sep. 24, 2020

(51) Int. Cl.
*B41J 2/045* (2006.01)
*B41J 2/14* (2006.01)

(52) U.S. Cl.
CPC ......... *B41J 2/04541* (2013.01); *B41J 2/0458* (2013.01); *B41J 2/04581* (2013.01)

(58) Field of Classification Search
CPC B41J 2/04541; B41J 2/04543; B41J 2/04555; B41J 2/0458; B41J 2/04581; B41J 2/14; B41J 2/14153; B41J 2/20; G01N 27/02; G01N 27/06
See application file for complete search history.

(56) References Cited

U.S. PATENT DOCUMENTS 6,561,622 B1 * 5/2003 Suzuki ................. B41J 2/16526
347/23
8,434,846 B2 * 5/2013 Tanaka ................. B41J 2/04581
347/14

(Continued)

FOREIGN PATENT DOCUMENTS

CN 103702835 4/2014
CN 104169091 11/2014

(Continued)

OTHER PUBLICATIONS

Inkjet Printing, Sep. 3, 2017, 11 pgs http://www.arundhaticartons.com/?page_id=58.

*Primary Examiner* — Anh T Vo
(74) *Attorney, Agent, or Firm* — Fabian VanCott

(57) ABSTRACT

A fluidic die may include at least one fluidic passageway, at least one electrode disposed within the at least one fluidic passageway, and control circuitry to activate the electrode within the fluidic die. An impedance sensed at the electrode corresponds to a particle concentration within the fluid. The control circuitry activates the electrode during a separate pulse group assigned to the activation of the electrode among at least one other pulse group assigned to an activation of at least one fluid actuator within a column group.

15 Claims, 9 Drawing Sheets

(56) References Cited

U.S. PATENT DOCUMENTS

| | | | |
|---|---|---|---|
| 8,840,217 B2* | 9/2014 | Yamagata | B41J 13/26 347/16 |
| 9,168,737 B1 | 10/2015 | Oi | |
| 2007/0076025 A1 | 4/2007 | Nagashima | |
| 2011/0292131 A1* | 12/2011 | Wei | B41J 2/175 347/61 |
| 2013/0278656 A1 | 10/2013 | Govyadinov et al. | |
| 2014/0204148 A1 | 7/2014 | Ge et al. | |
| 2014/0375710 A1 | 12/2014 | Blair et al. | |

FOREIGN PATENT DOCUMENTS

| | | |
|---|---|---|
| CN | 107206787 | 9/2017 |
| EP | 2952481 | 12/2015 |
| WO | WO-2015116956 | 8/2015 |
| WO | WO-2016018387 A1 | 2/2016 |
| WO | WO-2016068954 A1 | 5/2016 |
| WO | WO-2016122577 | 8/2016 |
| WO | WO-2016175740 | 11/2016 |
| WO | WO-2017082886 A1 | 5/2017 |

\* cited by examiner

FLUID PARTICLE CONCENTRATION DETECTION

BACKGROUND

A fluidic die may be used to move fluids within the fluidic die, eject fluids onto media, or combinations thereof. The fluids within a fluidic die may include any fluid that may be moved within or ejected from the fluidic die. For example, the fluids may include inks, dyes, chemical pharmaceuticals, biological fluids, gases, and other fluids. The fluids may be used to print images on media or effectuate chemical reactions between different fluids, for example. Further, in additive manufacturing processes such as those that use a three-dimensional (3D) printing device, the fluidic die may eject build materials, adhesives, and other fluids that may be used to build a 3D object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1A:
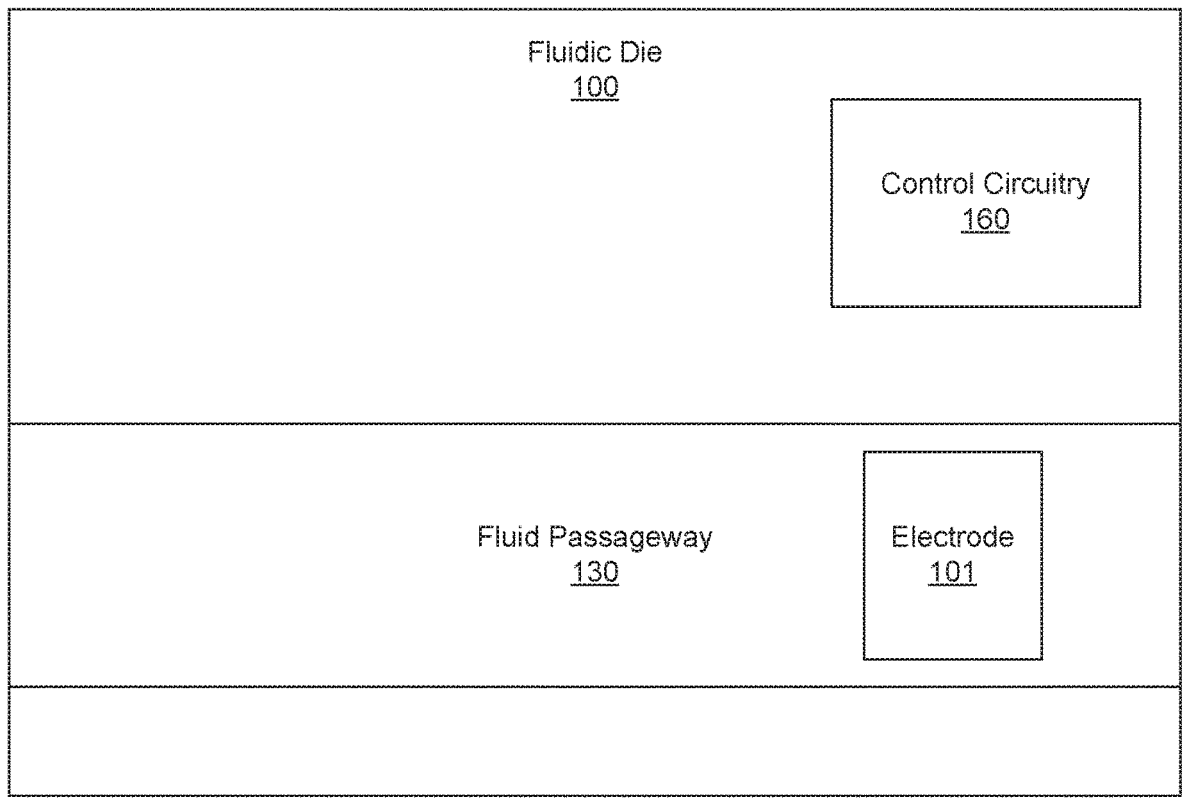
FIG. 1A is a block diagram of a fluidic die including an electrode used in fluid particle concentration detection, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Some fluids moved within and/or ejected from a fluidic die may include a fluid vehicle and particles where the fluid vehicle is used to carry or suspend a particle within the fluid vehicle. These types of fluids may include, for example, a printing fluid that includes color pigments suspended in an ink vehicle. Printing systems such as inkjet printers include printheads, and the printheads include firing chambers including nozzle regions having printing fluid therein, and fluid ejectors to eject the printing fluid in the nozzle regions onto media. Over time, the color pigments in the ink vehicle located in the nozzle region may diffuse and move away from the nozzle region resulting in pigment ink vehicle separation. The separation of the pigment particles from the ink vehicle may be referred to herein as pigment ink vehicle separation or pigment vehicle separation (PIVS), or may be generically referred to herein as particle vehicle separation (PVS).

PVS may occur when a particle-containing fluid sits in a portion of the fluidic die a period of, for example, seconds or minutes without being refreshed. Due to evaporation through a nozzle, and other effects related to the fluid formulation, particles within the fluid may over time, migrate out of a first portion of the fluidic die such as a fluid ejection chamber, and back into other fluid containing portions of the fluidic die such as a slot or shelf area. When PVS occurs, this leaves fluid in the chamber without its particle constituent. If, in the case of a pigmented ink, the pigmented ink is ejected from a nozzle in a PVS condition, a first number of ejected drops out of the nozzle will not have a correct amount or concentration of pigment particles or colorant in it, and will affect the print quality of that part of the printed image. Stated another way, as a consequence of PVS, for example, ejection of the printing fluid in the nozzle region with a reduced amount of color pigments onto the media results in a reduction of image quality due to the relatively lower concentration of pigment particles in the printing fluid that do not get ejected onto the media. A resulting print on the media in a PIVS situation may have a perceivable deficiency in vibrant colors and may look discolored, faded, dull, or pale. Additionally, at times, pigment ink vehicle separation may result in solidification of the printing fluid in the nozzle region. Particle interaction in a PVS scenario may cause a spectrum of responses based on characteristics of the particles and the environment in which the fluid exists, including, for example, the geometry of the particles and the design of the chambers within the fluidic die, among other characteristics. In this case, the respective nozzle region may prevent the ejection of printing fluid and reduce the lifespan of a corresponding fluid ejector.

Even though pigment inks are used herein as an example to describe a fluid vehicle and particles where the fluid vehicle is used to carry or suspend a particle within the fluid vehicle, similar fluids including particles and a fluid vehicle may be equally applicable. For example, some biological fluids such as blood may include particles suspended in a fluid vehicle. In the case of blood, blood includes bloods cells suspended in blood plasma. In this example, the blood cells may separate or diffuse where a higher concentration of blood cells exist in a first portion of the blood plasma relative to another portion of the blood plasma where there may exist a relatively lower concentration of blood cells. Therefore, PVS may occur in a wide range of fluids that are moved within and/or ejected from a fluidic die.

Detection of the separation of a particle from its fluid vehicle may allow for remedial measures to be taken to correct any particle concentration disparities within the fluid. Further, detection of PVS may take additional time from other operations the fluidic die may perform such as fluid ejection from the fluidic die. Thus, a detection process may be fit into or between a number of other fluidic die processes or operations such as, for example, pulse group operations that are used to move and/or eject fluid from the fluidic die. Control circuitry may be used to create a separate time period at which a PVS detection process may occur.

Examples described herein provide a fluidic die. The fluidic die may include at least one fluidic passageway, at least one electrode disposed within the at least one fluidic passageway, control circuitry to activate the electrode within the fluidic die. An impedance sensed at the electrode corresponds to a particle concentration within the fluid. The control circuitry activates the electrode during a separate pulse group assigned to the activation of the electrode among at least one other pulse group assigned to an activation of at least one fluid actuator within a column group.

The fluidic passageway may be a fluid ejection chamber, a fluid channel, or combinations thereof. The column group may include at least one pulse group, and a time period at which the control circuitry activates the electrode. The activation of at least one fluid actuator does not occur during the time period. An impedance sensed by the electrode correlates with the particle concentration within the fluid.

Examples described herein also provide a fluid ejection device including a fluid reservoir for storing a volume of fluid, a fluidic die fluidically coupled to the fluid reservoir, an electrode disposed within a fluidic passageway of the fluidic die, and control circuitry to activate the electrode within the fluidic die. An impedance sensed at the electrode defines a dispersion level of a solid within a fluid vehicle of the fluid. The control circuitry activates the electrode during a separate pulse group assigned to the activation of the electrode among at least one other pulse group assigned to an activation of at least one fluid actuator within a column group.

The voltage sensed at the electrode corresponds to an impedance of the fluid where a relatively lower impedance indicates a higher particle concentration within the fluid, and a relatively higher impedance indicates a lower particle concentration within the fluid. The column group may include at least one pulse group, and a time period at which the control circuitry activates the electrode. The activation of at least one fluid actuator does not occur during the time period.

Examples described herein also provide a method of detecting fluid particle concentration. The method may include, during a separate pulse group assigned to the activation of the electrode among at least one other pulse group assigned to an activation of at least one fluid actuator within a column group, providing a current to an electrode disposed within a fluidic passageway of a fluidic die. The current may be forced into a fluid within the fluidic die, an impedance is sensed at the electrode, and a fluid particle concentration value of the fluid may be determined based on the sensed impedance. In some examples, a relatively lower impedance corresponds to a lower particle concentration within the fluid, and a relatively higher impedance corresponds to a higher particle concentration within the fluid.

The fluid particle concentration value of the fluid is determined by the impedance sensed at the electrode where a relatively lower impedance indicates higher particle concentration within the fluid, and a relatively higher impedance indicates a lower particle concentration within the fluid. The method may also include determining if the fluid particle concentration value is below a threshold, and, in response to a determination that the pigment vehicle separation value is below the threshold, performing at least one process to increase the fluid particle concentration value. In response to a determination that the fluid particle concentration value is not above the threshold, a fluid ejection process may be allowed to occur.

The column group may include at least one pulse group, and a time period at which the control circuitry activates the electrode. The at least one process may include a micro-recirculation of the fluid within the fluidic passageway, a macro-recirculation of the fluid within the fluidic passageway, a spitting operation, a wiping the orifice plate of the fluidic die, or combinations thereof.

Turning now to the figures, FIG. 1A is a block diagram of a fluidic die (100) including an electrode (101) used in fluid particle concentration detection, according to an example of the principles described herein. The fluidic die (100) may include at least one fluidic passageway (130). At least one electrode (101) may be disposed within the at least one fluidic passageway (130).

The fluidic die (100) may also include control circuitry (160) to activate the electrode (101) within the fluidic die (100). An impedance sensed at the electrode (101) corresponds to a particle concentration within the fluid. Further, the control circuitry (160) activates the electrode (101) during a separate pulse group assigned to the activation of the electrode (101) among at least one other pulse group assigned to an activation of at least one fluid actuator within a column group.

Figure 1B:
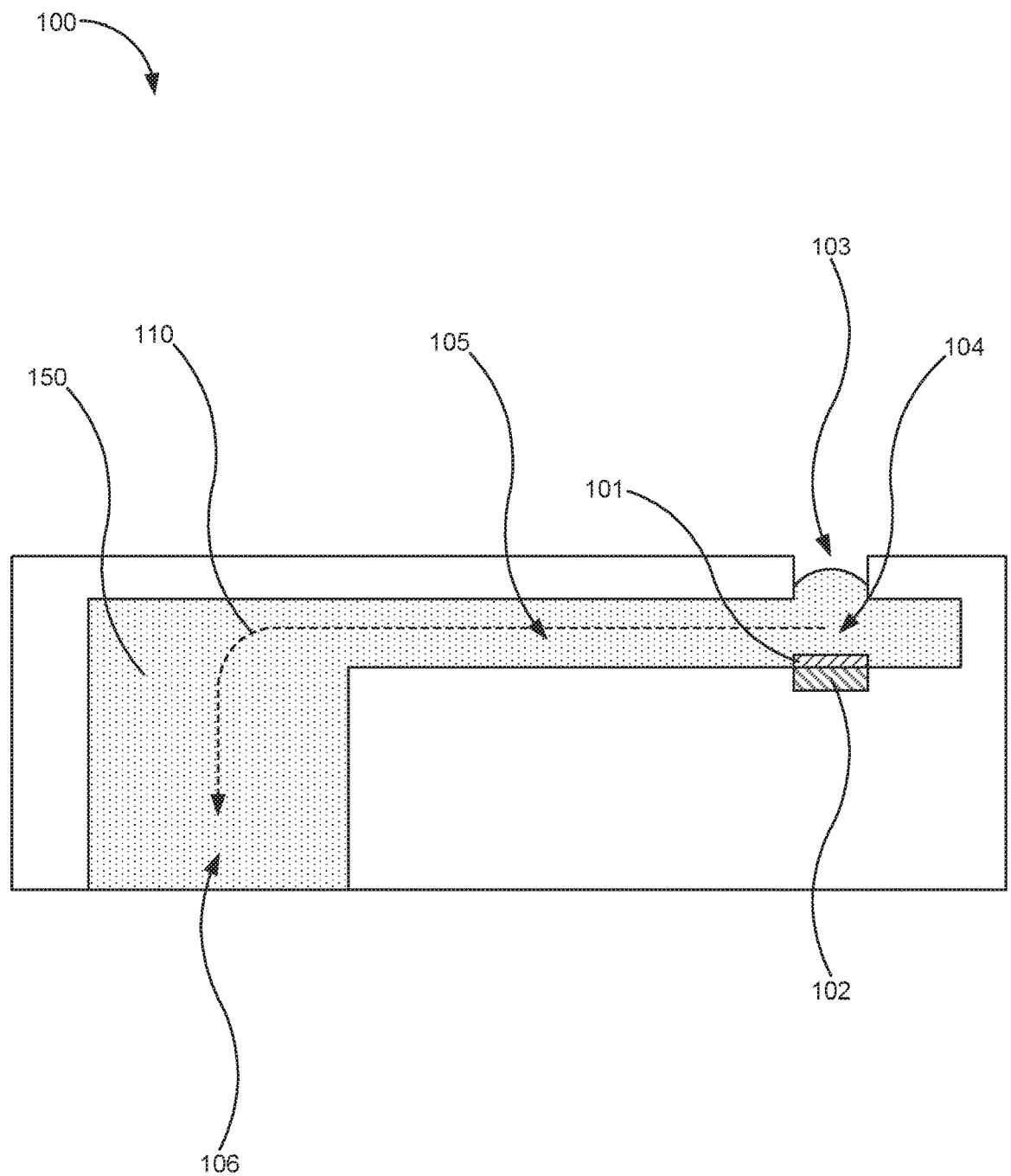
FIG. 1B is a block diagram of a portion of a fluidic die including an electrode used in fluid particle concentration detection, according to an example of the principles described herein.

FIG. 1B is a block diagram of a portion of a fluidic die (100) including an electrode (101) used in fluid particle concentration detection, according to an example of the principles described herein. The fluidic die (100) may include a number of passageways, channels, and chambers in which the fluid (150) circulates or moves. In one example, a number of fluid slots (106) may be used to deliver fluid to a number of fluid channels (105) and into a number of fluid ejection chambers (104).

Each of the fluid ejection chambers (104) may include an actuator (102) used to eject a volume of the fluid (150) from the ejection chamber (104), out a nozzle (103), and onto a media, for example. The actuators (102) may be, for example, thermal heating devices used to form a drive bubble of vaporized fluid separated from liquid fluid by a bubble wall. The drive bubble may be used to force the fluid from the fluid ejection chamber (104) and out the nozzle (103). Once the drive bubble collapses, additional fluid from a reservoir may flow into the fluid slots (106), fluid channels (105), and fluid ejection chambers (104), replenishing the lost fluid volume from the creation of the drive bubble and the ejection of the fluid. This process may be repeated each time the fluidic die (100) is instructed to eject fluid. In another example, the actuators (102) may be piezoelectric actuators to generate a pressure pulse that forces a volume of the fluid out of the nozzle (103). In this example, the piezoelectric actuators may include a piezoelectric material that has a polarization orientation that provides a motion into the fluid ejection chambers (104) when and electrical charge is applied to the piezoelectric material.

The fluidic die (100) may also include an electrode (101) used to detect the concentration of the fluid. In one example, the electrode (101) may be placed above the actuator (102) as depicted in FIG. 1B. However, the electrode (101) may be placed anywhere within the fluidic die (100) including, for example, the fluid slots (106), the fluid channels (105), other areas within the fluid ejection chambers (104), other fluidic passageways within the fluidic die (100), or combinations thereof. The electrode (101) is electrically coupled to control circuitry associated with the fluidic die (100) to allow for the control circuitry to actuate the electrode when a particle concentration of the fluid is to be determined.

A current may be applied to the electrode (101) when a fluid particle concentration is to be detected, and a voltage may be measured. Conversely, in another example, a voltage may be applied to the electrode (101) when a fluid particle concentration is to be detected, and a current may be measured. In this example, the voltage applied to the electrode (101) is a non-nucleating and non-drive-bubble-forming pulse. In contrast, when a portion of the fluid (150) is to be ejected from the fluidic die (100), the actuator (102) may be actuated to create a drive bubble as described herein. Thus, a fixed current may be applied to the fluid (150) surrounding the electrode (101), and a resulting voltage at the electrode (101) may be sensed. The sensed voltage may be used to determine an impedance of the fluid (150) surrounding the electrode (101) at that area within the fluidic die (100) at which the electrode (101) is located. Electrical impedance is a measure of the opposition that the circuit formed from the electrode (101) and the fluid (150) presents to a current when a voltage is applied to the electrode (101), and may be represented as follows:

$$Z = \frac{V}{I} \qquad \text{Eq. 1}$$

where Z is the impedance in ohms ($\Omega$), V is the voltage applied to the electrode (101), and I is the current applied to the fluid (150) surrounding the electrode (101). In another example, the impedance may be complex in nature, such that there may be a capacitive element to the impedance where the fluid may act partially like a capacitor. A measured capacitance in this example may change with the properties of the fluid such as particle concentration.

The detected impedance (Z) is proportional or corresponds to a particle concentration in the fluid. Stated in another way, the impedance (Z) corresponds to a dispersion level of the particles within the fluid vehicle of the fluid. In one example, if the impedance is relatively lower, this indicates that a higher particle concentration exists within the fluid in that area at which the particle concentration is detected. Conversely, if the impedance is relatively higher, this indicates that a lower particle concentration exists within the fluid in that area at which the particle concentration is detected. Lower particle concentration within a portion the fluid may indicate that PVS has occurred, and that remedial measures may be taken to ensure that the particle concentration is made homogeneous throughout all the fluid within the fluidic die (100), homogeneous throughout the fluid in the fluid slots (106), fluid channels (105), fluid ejection chambers (104) or combinations thereof, or homogeneous based on an original or manufactured homogeneity of the fluid.

The detection of PVS may be made during a separate pulse group assigned to the activation of the electrode (101) among at least one other pulse group assigned to an activation of at least one fluid actuator (102) within a column group such as, for example, the fluid actuator (102) used to eject the fluid form the fluidic die (100) or another fluid actuator used to move the fluid within the fluidic die (100). A current may be provided to the electrode (101) disposed within a fluidic passageway (104,105,106) of the fluidic die (100) where the current is forced into the fluid (150) within the fluidic die (100). The impedance may be sensed at the electrode (101), and a fluidic particle concentration value of the fluid (150) may be determined based on the sensed impedance.

In one example, the column group includes at least one pulse group, and a time period at which the control circuitry activates the electrode (101). In one example, the column group includes eight pulse groups during which eight groups of the fluid actuators (102) within the fluidic die (100) are activated, and an extra pulse group used to activate the electrode (101). The extra pulse group may be located anywhere within the sequence of eight pulse groups, and, in one example, is located after all eight pulse groups. More regarding the extra pulse group within the column group is described herein.

Figure 2:
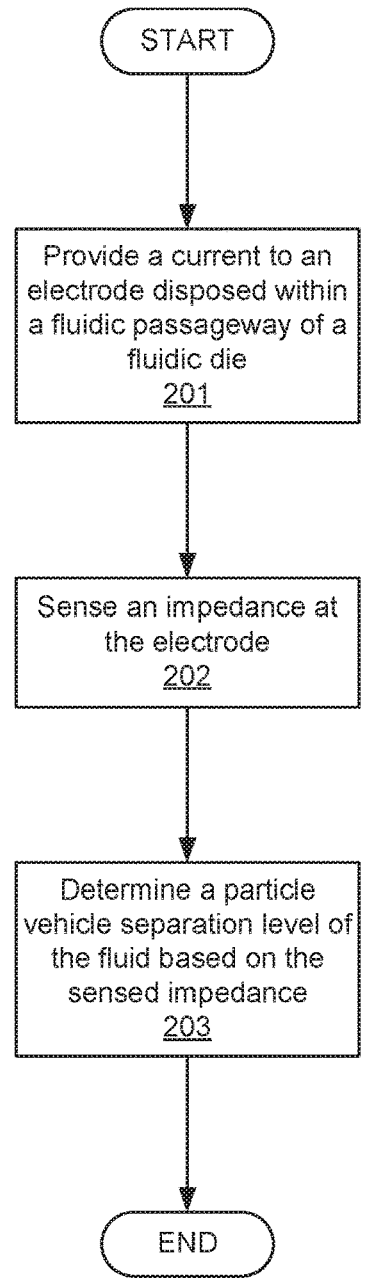
FIG. 2 is a flowchart showing a method of detecting fluid particle concentration, according to an example of the principles described herein.

FIG. 2 is a flowchart showing a method (200) of detecting fluid particle concentration, according to an example of the principles described herein. The method of FIG. 2 may begin by providing (block 201) a current to the electrode (101) disposed within a fluidic passageway of the fluidic die (100). An impedance may be sensed (block 202) at the electrode (101), and a particle vehicle separation level may be determined (block 203) within the fluid (150) based on the sensed impedance. As described herein, a sensed voltage or current may be converted to an impedance, and the impedance may be used to determine (block 203) the particle vehicle separation level. In this manner, the PVS of the fluid within the fluidic die (100) may be determined based on the impedance value detected by the electrode (101).

In one example, the method of claim 2 may be performed during a quiescent period of the fluidic die (100). In one example, a quiescent period of the fluidic die (100) may include a steady-state (DC) voltage or current at a specified terminal of the fluidic die (100) with no input signal applied. For example, the quiescent period may be a period during when electrical noise sources such as firing currents are quiet or are not present, and when no drive bubble is present in the fluid ejection chambers (104).

Figure 3:
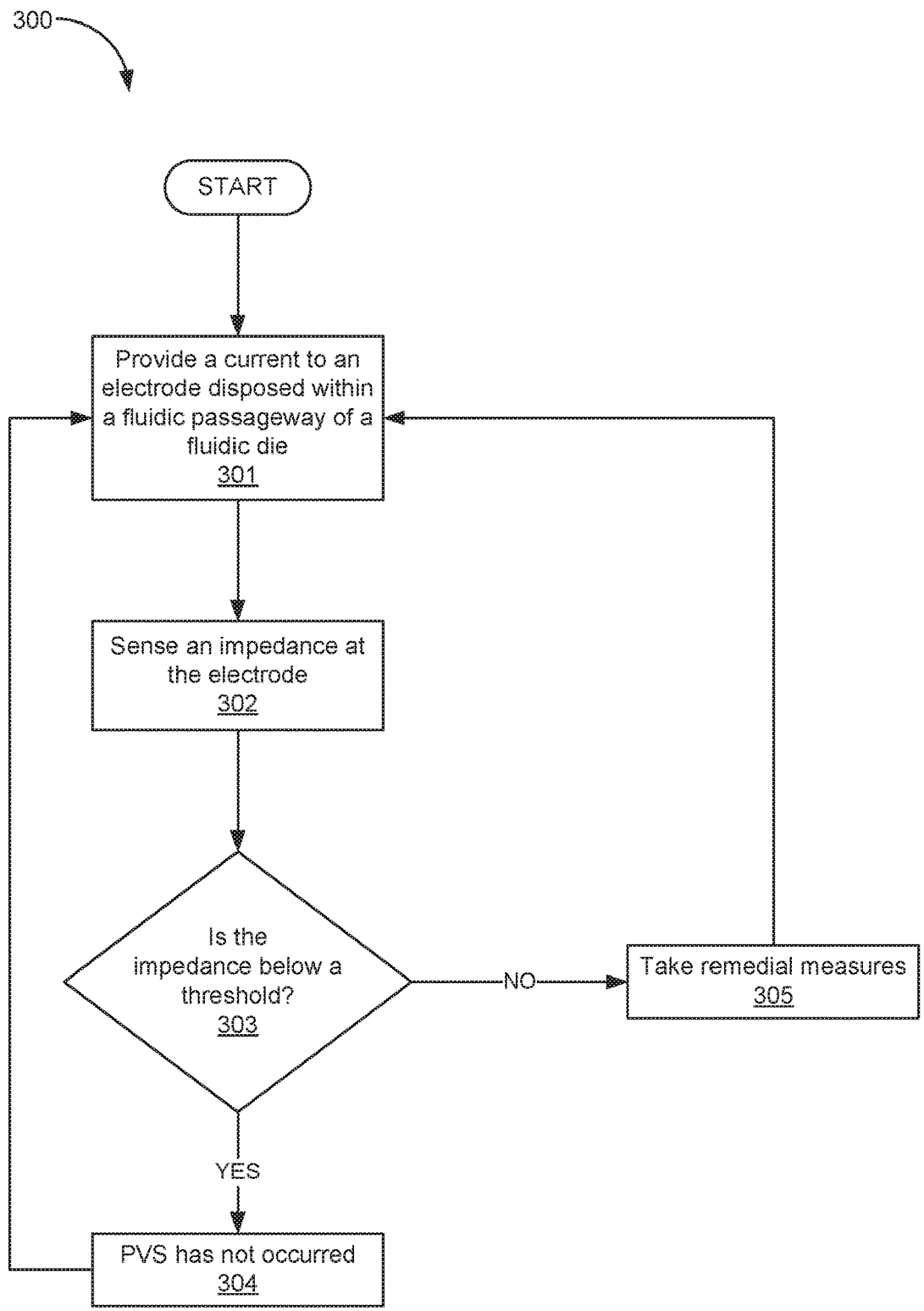
FIG. 3 is a flowchart showing a method of detecting fluid particle concentration, according to another example of the principles described herein.

FIG. 3 is a flowchart showing a method (300) of detecting fluid particle concentration, according to another example of the principles described herein. The method of FIG. 3 may begin by providing (block 301) a current to the electrode (101) disposed within a fluidic passageway of the fluidic die (100). An impedance may be sensed (block 302) at the electrode (101).

The sensed voltage may be converted to an impedance, and, at block 303, it may be determined (block 303) whether the impedance is below a threshold. In one example, the threshold may be set based on a desired print quality at various levels of PVS. In other words, the threshold in this example may be based on an impedance level that results in at least a desired print quality or better. In one example, the threshold may be set by an operator of the fluidic die such that the operator may indicate a desired print quality that corresponds to an identified impedance level.

In response to a determination that the impedance is below a threshold (block 303, determination YES), particle vehicle separation (PVS) has not occurred (block 304), or PVS has not occurred to a level at which the print quality of a printed media is decreased. In one example, the method (300) may loop back to block 301 in order to allow for another fluid particle concentration detection instance to occur. This looping allows for any number of fluid particle concentration detection instance to occur.

In response to a determination that the impedance is not below (i.e., is above) a threshold (block 303, determination NO), particle vehicle separation (PVS) has occurred (block 304), or PVS has occurred to a level at which the print quality of a printed media is decreased, a number of remedial measures may be taken (block 305) to correct the PVS and increase the particle concentration to a homogeneous level. the remedial measures may include, for example, activation of a number of pumps internal and external to the fluidic die (100) to move the particles within the fluid into a homogeneous state, activation of the actuator (102) used to eject a volume of the fluid (150) from the ejection chamber (104) during, or example a spitting operation, other remedial measures, or combinations thereof. In one example, the method (300) may loop back to block 301 in order to allow for another fluid particle concentration detection instance to occur. The fluid particle concentration detection may be in connection with the same electrode (101), or may be performed in connection with a newly-selected electrode (101). This looping allows for any number of fluid particle concentration detection instances to occur.

The impedance sensed by the electrode correlates with the particle concentration within the fluid. Although an impedance below the threshold may indicate that PVS has not occurred, and an impedance above the threshold may indicate that PVS has occurred, in some systems and methods, the opposite may be true. For example, in some situations the detected voltage and determined impedance level may be used such that an impedance above the threshold may indicate that PVS has not occurred, and an impedance below the threshold may indicate that PVS has occurred.

Figure 4:
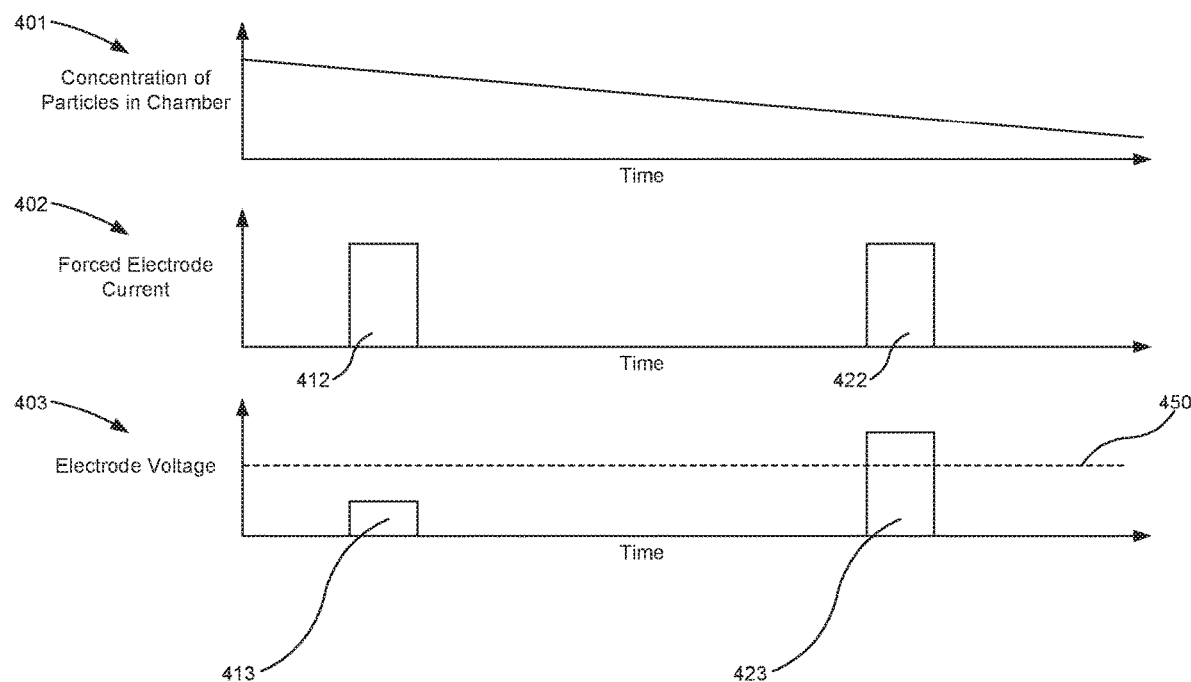
FIG. 4 depicts a number of graphs depicting the concentration of particles, forced electrode current, and electrode voltage over time, according to an example of the principles described herein.

FIG. 4 depicts a number of graphs (401, 402, 403) depicting the concentration of particles, forced electrode current, and electrode voltage over time, according to an example of the principles described herein. In graph (401), the concentration of particles in the fluid vehicle may, over time, be reduced in, for example, the fluid ejection chamber (104) as the particles move to other areas of the fluidic die (100) such as the fluid slots (106) and fluid channels (105). In this state, the fluid vehicle of the fluid may be in higher abundance relative to the particles within the fluid. As the fluid (150) within the fluidic die (100) sits without being moved within or ejected from the fluidic die (100), PVS begins to occur, and the longer the fluidic die (100) remains in this state, the greater the amount of pigments separate from the fluid vehicle.

In graphs 402 and 403, a forced electrode current is depicted as being equal in two separate instances where the forced electrode current (412) is used to detect a PVS level in a first instance, and an identical forced electrode current (422) is used to detect a PVS level in a second instance. In graph 403, during the forced electrode current (412) in the first instance of PVS detection, the electrode voltage (413) detected and the corresponding impedance level is below a PVS detection threshold (450). In this state, it is determined that PVS has not occurred (block 304), or PVS has not occurred to a level at which the print quality of a printed media is decreased. However, during the forced electrode current (422) in the second instance of PVS detection, the electrode voltage (423) detected and the corresponding impedance level is above a PVS detection threshold (450) corresponding to an unacceptable PVS state. In this state, it is determined that PVS has occurred (block 304), or PVS has occurred to a level at which the print quality of a printed media is decreased, and a number of remedial measures may be taken (block 305) to correct the PVS and increase the particle concentration to a homogeneous level. At least one remedial process may be implemented, and the remedial processes may include, for example, a micro-recirculation of the fluid (150) within the passageways of the fluidic die (100), a macro-recirculation of the fluid (150) within the passageways of the fluidic die (100), a spitting operation, an adjustment of a backpressure of the fluid (150) to pull a meniscus of the fluid (150) into the fluidic passageway and a burning of kogated fluid (150), a wiping an orifice plate of the fluidic die (100), or combinations thereof. The electrode voltage (403) profiles depicted in FIG. 4 are examples, and the electrode voltage (403) profiles may be of different shape and/or magnitude than those depicted in FIG. 4. These electrode voltage (403) profiles may be assessed so as to determine particle concentration.

Figure 5:
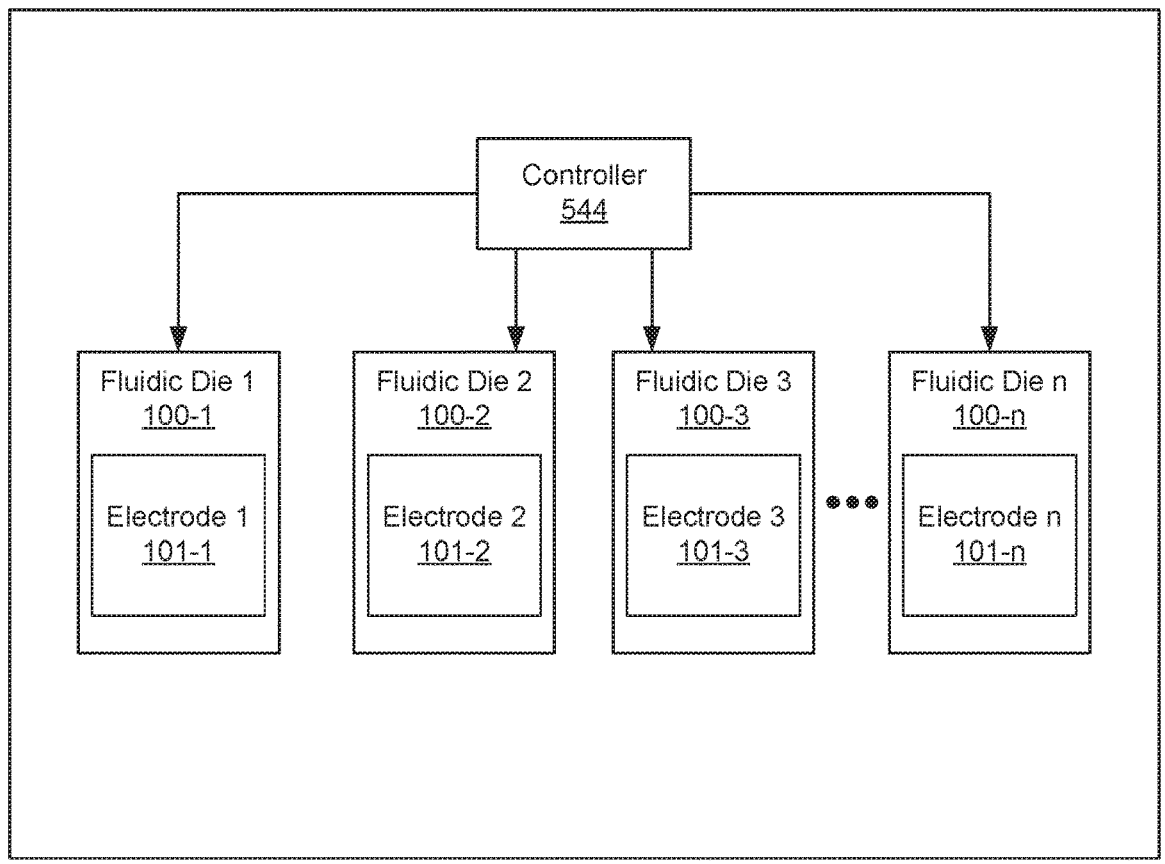
FIG. 5 is a block diagram of a printing device including a number of fluidic die, according to an example of the principles described herein.

FIG. 5 is a block diagram of a printing device (500) including a number of fluidic die (100), according to an example of the principles described herein. The printing device (500) may include a controller (544). The controller (544) represents the programming, processor(s), and associated memories, along with other electronic circuitry and components that control the operative elements of the printing device (500) and the activation of the electrode (101) used in fluid particle concentration detection. The printing device (500) may include an arrangement of fluidic ejection dies (100) for dispensing fluid onto a sheet or continuous web of paper or other print substrate. Each fluid ejection die (100-1, 100-2, 100-3, 100-n, collectively referred to herein as 100) includes a number of electrodes (101-1, 101-2, 101-3, 101-n, collectively referred to herein as 101). The ellipsis depicted between fluid ejection die 100-3 and fluid ejection die 100-n indicates that there may be any number of fluid ejection dies (100) each with any number of electrodes (101) within the printing device (500). The controller (544) controls the activation of the electrodes (101) used in fluid particle concentration detection, and includes the programming, processor(s), and associated memories to perform the methods of FIGS. 3 and 4. For example, the controller (544) controls the timing at which each electrode (101) is activated, and may do so during a quiescent period of each fluidic die (100). Further, the controller (544) may determine a voltage at which the electrode (101) may be activated to provide a non-nucleating and non-drive-bubble-forming current through the fluid (150). Further, the controller (544) includes the programming, processor(s), and associated memories to determine a particle vehicle separation level based on a sensed voltage at the electrode (101), and convert that sensed voltage to an impedance. Even still further, the controller (544) includes the programming, processor(s), and associated memories to determine whether the impedance is above or below a threshold, and take remedial measures if it is determined that PVS has occurred based on that threshold.

Figure 6:
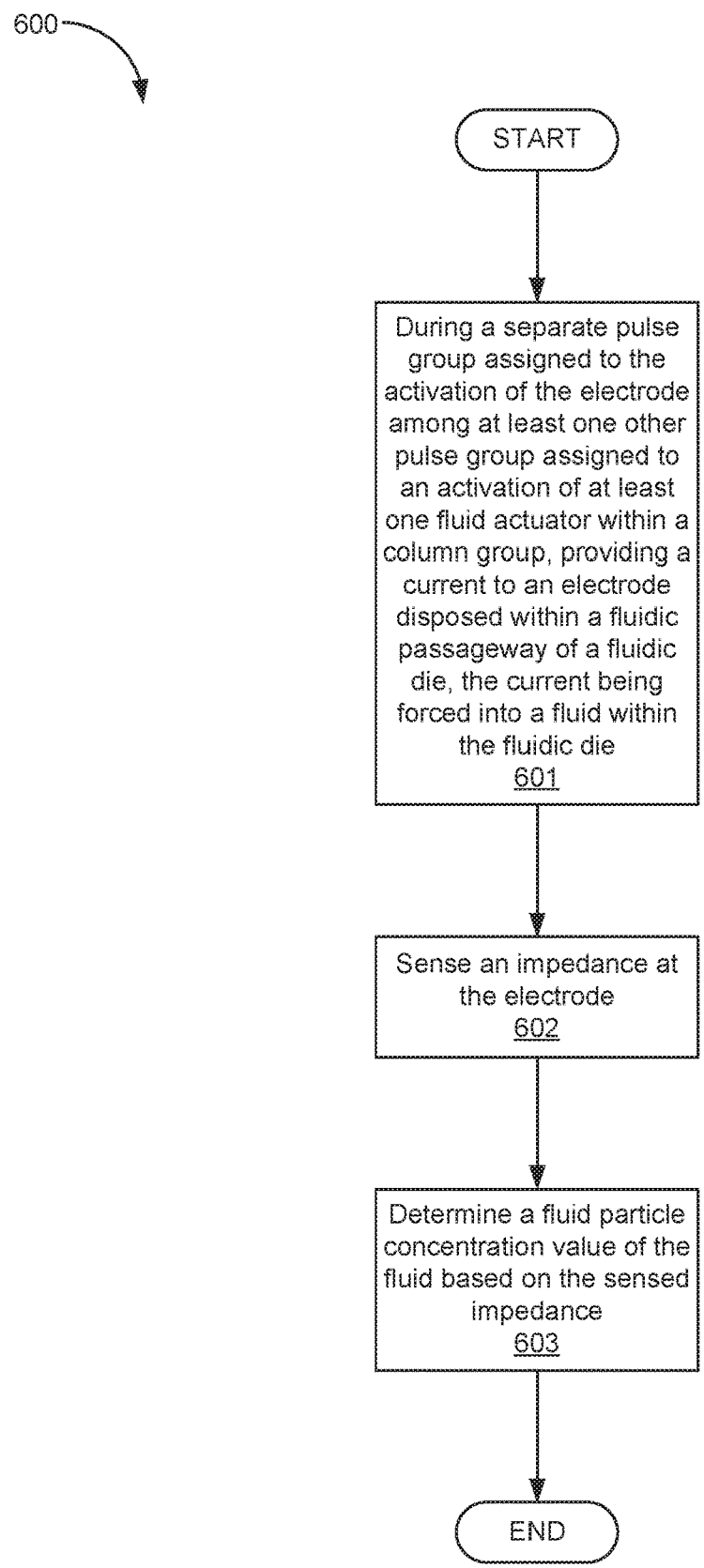
FIG. 6 is a flowchart showing a method of detecting fluid particle concentration, according to another example of the principles described herein.
Figure 7:
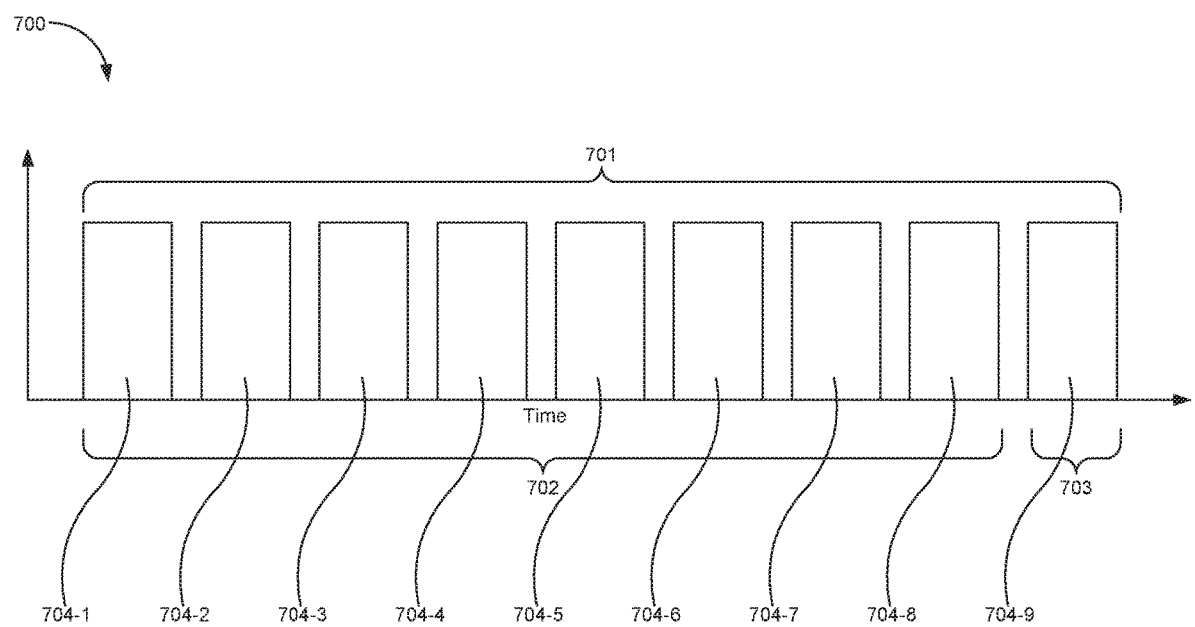
FIG. 7 is a graph depicting an activation sequence of a column group, according to another example of the principles described herein.

FIG. 6 is a flowchart showing a method (600) of detecting fluid particle concentration, according to another example of the principles described herein. FIG. 7 is a graph depicting an activation sequence (700) of a column group, according to another example of the principles described herein, and will be described in connection with FIG. 6. The method (600) of FIG. 6 may begin by providing (block 601) a current to an electrode (101) disposed within a fluidic passageway (104, 105, 106) of a fluidic die (100). The current may be forced into the fluid (150) within the fluidic die (100) during a separate pulse group (703) assigned to the activation of the electrode (100) among at least one other pulse group (702) assigned to an activation of at least one fluid actuator (102) within a column group (701). In the example, of FIG. 7, the column group (701) includes eight pulses (704-1, 704-2, 704-3, 704-4, 704-5, 704-6, 704-7, 704-8) within the pulse group (702) and an extra pulse (704-9) within an extra, separate pulse group (703). Further, in the example of FIG. 7, the extra, separate pulse group (703) and its extra pulse (704-9) is temporally located at the end of the column group (702) after the pulse group (702) and the activation of eight fluid actuators (102) with the fluidic die (100) using the eight pulses (704-1, 704-2, 704-3, 704-4, 704-5, 704-6, 704-7, 704-8). However, the extra, separate pulse group (703) and its extra pulse (704-9) may be temporally located anywhere among the activation sequence (700).

In a fluidic die (100) including a plurality of fluid actuators (102), the fluid actuators (102) may be arranged into groups referred to as primitives. These primitives may be individually supplied electrical current in sequence from an electrical power supply. When the fluidic die (100) is operated, the plurality of fluid actuators (102) are cycled through such that a single fluid actuator (102) is energized at a time for a particular primitive. However, multiple primitives within the fluidic die (100) may be fired simultaneously. In the examples described herein, the primitives may include the column group (701) with its eight pulses (704-1, 704-2, 704-3, 704-4, 704-5, 704-6, 704-7, 704-8) within the pulse group (702) and extra pulse (704-9) within extra, separate pulse group (703). Further, the fluidic die (100) may include a plurality of primitives.

For each of the eight pulses (704-1, 704-2, 704-3, 704-4, 704-5, 704-6, 704-7, 704-8), a nucleating fire pulse signal may be provided to actuate the actuator (102). However, for the sensing pulse group (703), a second, non-nucleating fire pulse signal may be provided to an electrode (101) being measured.

In one example, the column group (701) may be used to print the fluid (150) onto a media by ejecting the fluid (150) from the ejection chamber (104), out a nozzle (103), and onto the media. In this example, each column group (701) includes a number of groups of nozzle firing data in the form of the pulse group (702) and activation data in the form of the pulse group (703) to print one column on the media per swath. In this example, there is one set of nozzle firing data per address. Each set of data is loaded and fired in sequence, until all addresses have been fired. For each of the pulses (704-1, 704-2, 704-3, 704-4, 704-5, 704-6, 704-7, 704-8), a different address may be fired.

Further, in this example, each column group (701) has an additional time period at the end that is used for the purpose of dealing with timing variations induced by the printer mechanism, but may be repurposed for the activation of an electrode (101) to determine a fluid particle concentration. An additional time period may be created in addition to the electrode activation time period to allow for the column group (701) to handle any timing variations. No firing of the actuators (102) is performed during this extra time slice (703). This extra time slice (703) is utilized by performing PVS detection during it. This allows for real-time PVS detection and servicing during printing, even mid swath. In one example, if higher speed PVS detection is desired, one set of PVS detection circuitry may be included per primitive including a current source and comparator, thereby allowing for a nozzle (103) and fluid ejection chamber (104) pair from each primitive to be tested simultaneously. For an eight-address fluidic die (100), eight test intervals may be used to test all the nozzle (103) and fluid ejection chamber (104) pairs. Given that PUS detection is not reliant on nozzle firing, all eight test intervals may be performed within the one-time slice provided by the separate pulse group (703).

Placing an extra pulse (704-9) within extra, separate pulse group (703) of the column group (701) along with the eight pulses (704-1, 704-2, 704-3, 704-4, 704-5, 704-6, 704-7, 704-8) within the pulse group (702) allows for PUS detection and servicing during activation of the column group (701) such as while printing onto media. Further, with the activation sequence (700) of FIG. 7, the extra pulse (704-9) within extra, separate pulse group (703) of the column group (701) may be temporally located mid-swath where the extra pulse (704-9) is located between any of the eight pulses (704-1, 704-2, 704-3, 704-4, 704-5, 704-6, 704-7, 704-8). Further, the addition of the extra pulse (704-9) within extra, separate pulse group (703) of the column group (701) allows for the utilization of an unused amount of time within the column group (701) that does not affect other functions of the fluidic die (100) such as those functions performed during a printing operation. In one example, an additional time period may be created in addition to the separate pulse group (703) of the column group (701) to allow for the column group (701) to handle any timing variations.

The method of FIG. 6 may also include sensing (block 602) an impedance at the electrode (101), and determining (block 603) a fluid particle concentration value of the fluid (150) based on the sensed impedance as described herein. In this manner, PVS may be detected and remedied as described above in connection with FIGS. 2 and 3.

Figure 8:
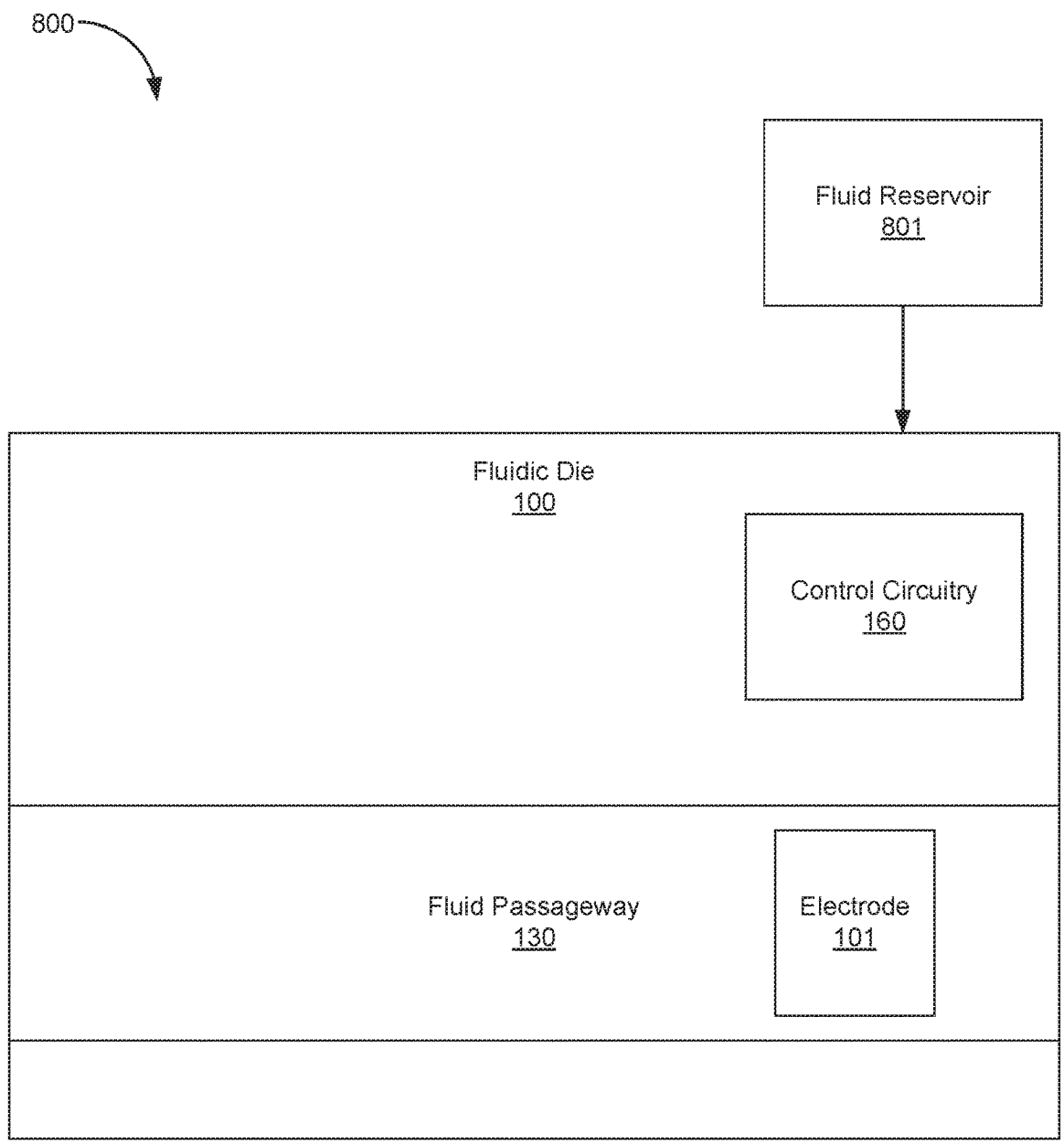
FIG. 8 is a block diagram of a fluidic ejection device including an electrode used in fluid particle concentration detection, according to an example of the principles described herein.

FIG. 8 is a block diagram of a fluidic ejection device (800) including an electrode (101) used in fluid particle concentration detection, according to an example of the principles described herein. The fluidic ejection device (800) may include a fluid reservoir (801) for storing a volume of fluid (150). A fluidic die (100) may be fluidically coupled to the fluid reservoir (801).

An electrode (101) may be disposed within a fluidic passageway (130) of the fluidic die (100). The fluidic ejection device (800) may include control circuitry (160) to activate the electrode (101) within the fluidic die (100). An impedance sensed at the electrode (101) defines a dispersion level of a solid within a fluid vehicle of the fluid (150). Further, the control circuitry activates the electrode (101) during a separate pulse group assigned to the activation of the electrode (101) among at least one other pulse group assigned to an activation of at least one fluid actuator within a column group.

The specification and figures describe a fluid particle concentration detection device may include at least one electrode disposed within a fluidic passageway of a fluidic die, control circuitry to activate the electrode within the fluidic die. An impedance sensed at the electrode corresponds to a particle concentration within the fluid. The control circuitry activates the electrode during a separate pulse group assigned to the activation of the electrode among at least one other pulse group assigned to an activation of at least one fluid actuator within a column group.

The preceding description has been presented to illustrate and describe examples of the principles described. This description is not intended to be exhaustive or to limit these principles to any precise form disclosed. Many modifications and variations are possible in light of the above teaching.

What is claimed is:
1. A fluidic die comprising:
at least one fluidic passageway;
at least one electrode disposed within the at least one fluidic passageway; and
a control circuitry to activate the electrode within the fluidic die,
wherein an impedance sensed at the electrode corresponds to a particle concentration within a fluid, and
wherein the control circuitry activates the electrode during a separate pulse group assigned to the activation of the electrode among at least one other pulse group assigned to an activation of at least one fluid actuator within a column group.

2. The fluidic die of claim 1, wherein the fluidic passageway is a fluid ejection chamber, a fluid channel, or combinations thereof.

3. The fluidic die of claim 1, wherein the column group comprises:
   at least one pulse group; and
   a time period at which the control circuitry activates the electrode.

4. The fluidic die of claim 3, wherein activation of at least one fluid actuator does not occur during the time period.

5. The fluidic die of claim 1, wherein an impedance sensed by the electrode correlates with the particle concentration within the fluid.

6. A fluidic ejection device, comprising:
   a fluid reservoir for storing a volume of a fluid;
   a fluidic die fluidically coupled to the fluid reservoir;
   an electrode disposed within a fluidic passageway of the fluidic die; and
   a control circuitry to activate the electrode within the fluidic die,
   wherein an impedance sensed at the electrode defines a dispersion level of a solid within a fluid vehicle of a fluid, and
   wherein the control circuitry activates the electrode during a separate pulse group assigned to the activation of the electrode among at least one other pulse group assigned to an activation of at least one fluid actuator within a column group.

7. The fluidic ejection device of claim 6, wherein a voltage sensed at the electrode defines an impedance of the fluid wherein:
   a relatively lower impedance indicates a higher particle concentration within the fluid; and
   a relatively higher impedance indicates a lower particle concentration within the fluid.

8. The fluidic ejection device of claim 6, wherein the column group comprises:
   at least one pulse group; and
   a time period at which the control circuitry activates the electrode.

9. The fluidic ejection device of claim 6, wherein activation of at least one fluid actuator does not occur during the time period.

10. A method of detecting fluid particle concentration, comprising:
    during a separate pulse group assigned to an activation of the electrode among at least one other pulse group assigned to an activation of at least one fluid actuator within a column group, providing a current to an electrode disposed within a fluidic passageway of a fluidic die, the current being forced into a fluid within the fluidic die;
    sensing an impedance at the electrode; and
    determining a fluid particle concentration value of the fluid based on the sensed impedance.

11. The method of claim 10, wherein the fluid particle concentration value of the fluid is defined by the impedance sensed at the electrode, and wherein:
    a relatively lower impedance indicates higher particle concentration within the fluid; and
    a relatively higher impedance indicates a lower particle concentration within the fluid.

12. The method of claim 10, comprising:
    determining if the fluid particle concentration value is below a threshold; and
    in response to a determination that the pigment vehicle separation value is below the threshold, performing at least one process to increase the fluid particle concentration value.

13. The method of claim 12, comprising, in response to a determination that the fluid particle concentration value is not above the threshold, allowing a fluid ejection process to occur.

14. The method of claim 10, wherein the column group comprises:
    at least one pulse group; and
    a time period at which the control circuitry activates the electrode.

15. The method of claim 12, wherein the at least one process comprises a micro-recirculation of the fluid within the fluidic passageway, a macro-recirculation of the fluid within the fluidic passageway, a spitting operation, a wiping the orifice plate of the fluidic die, or combinations thereof.

* * * * *